(12) United States Patent  (10) Patent No.: US 8,087,557 B2
Larsson et al.  (45) Date of Patent: Jan. 3, 2012

(54) LOAD CARRIER FOR FIXED ROOF RAIL

(75) Inventors: Fredrik Larsson, Vaggeryd (SE);
Wolf-Dietrich Lenk, Asperg (DE)

(73) Assignee: Thule Sweden AB, Hillerstorp (SE)

( * ) Notice: Subject to any disclaimer, the term of this patent is extended or adjusted under 35 U.S.C. 154(b) by 1058 days.

(21) Appl. No.: 11/815,524

(22) PCT Filed: Jan. 26, 2006

(86) PCT No.: PCT/SE2006/000116
§ 371 (c)(1),
(2), (4) Date: Oct. 24, 2007

(87) PCT Pub. No.: WO2006/083213
PCT Pub. Date: Aug. 10, 2006

(65) Prior Publication Data
US 2008/0203125 A1  Aug. 28, 2008

(30) Foreign Application Priority Data
Feb. 4, 2005 (EP) .................................... 05002332

(51) Int. Cl.
*B60R 9/058* (2006.01)
(52) U.S. Cl. ........ 224/321; 224/322; 224/325; 224/326; 224/558
(58) Field of Classification Search ................ 224/317, 224/319, 320, 321, 322, 325, 326, 327, 558; 280/769
See application file for complete search history.

(56) References Cited

U.S. PATENT DOCUMENTS

| | | | |
|---|---|---|---|
| 5,556,221 A | 9/1996 | Brunner | |
| 5,577,650 A | 11/1996 | Stapleton | |
| 6,050,466 A * | 4/2000 | Cronce et al. | 224/321 |
| 6,102,265 A * | 8/2000 | Stapleton | 224/321 |
| 6,273,311 B1 * | 8/2001 | Pedrini | 224/321 |
| 6,796,471 B2 * | 9/2004 | Aftanas et al. | 224/321 |
| 6,918,521 B2 * | 7/2005 | Settelmayer et al. | 224/319 |
| 7,469,807 B2 * | 12/2008 | Jeong | 224/321 |
| 2004/0074939 A1 | 4/2004 | Aftanas et al. | |
| 2004/0118886 A1 | 6/2004 | Mirshafiee et al. | |

* cited by examiner

*Primary Examiner* — Gary Elkins
(74) *Attorney, Agent, or Firm* — Novak Druce + Quigg LLP

(57) ABSTRACT

A load carrier that includes a load carrier bar with a load carrier foot at each end of the load carrier bar. Each load carrier foot has a fixed clamping jaw and a movable clamping jaw configured to be arranged on an upper side and an opposite lower side of the respective roof rails and to cooperate with a clamping device that is configured to move the movable clamping jaw towards the fixed clamping jaw. The movable clamping jaw is pivotally connected at the load carrier foot and in a first mounting position. The movable clamping jaw is firmly connected to at least one guiding protrusion, located on a distance from the movable clamping jaw and in a first mounting position is arranged so that the distance between the guiding protrusions, which are located at each end of the load carrier, is larger than the distance between the roof rails.

10 Claims, 5 Drawing Sheets

LOAD CARRIER FOR FIXED ROOF RAIL

TECHNICAL FIELD

The present disclosure is directed toward a load carrier for fixed roof rails of a vehicle. The load carrier comprises (includes) a load carrier bar with a load carrier foot at each end of the load carrier bar for clamping the load carrier to a pair of essentially parallel roof rails. Each load carrier foot includes a fixed clamping jaw and a movable clamping jaw adapted to be arranged on an upper side and an opposite lower side of the respective roof rail and that cooperates with a clamping device arranged to move the movable clamping jaw towards the fixed clamping jaw in such way that the load carrier foot is firmly clamped at the respective roof rail. Further, the movable clamping jaw is pivotally connected at the load carrier foot and in a first mounting position is arranged in such way that the distance between the movable clamping jaws, which are located at each end of the load carrier, is less than the distance between the roof rails.

BACKGROUND

US 2004/0118886 discloses a load carrier of the type introduced above, but has an upper fixed clamping jaw and a movable hook with a lower clamping jaw that cooperates with a lever to clamp the movable hook in such way that the clamping jaws being moved towards each other and the load carrier foot being firmly clamped to a roof rail of a vehicle.

Another known load carrier is described in US 2004/0074939. This load carrier also comprises an upper fixed clamping jaw and a movable hook with a lower clamping jaw that cooperates with a lever to clamp the movable hook in such way that the clamping jaws are moved towards each other and the load carrier foot is firmly clamped at a roof rail of a vehicle. In a mounting position, the movable hook may be arranged essentially vertically, which in turn means that the load carrier is mounted vertically towards the roof rail.

The problem with load carriers of the design described immediately above is that it may be difficult to arrange the load carrier so that the load carrier foot at each end of the load carrier bar properly grips around respective roof rails. Often the load carrier must be moved diagonally between two parallel roof rails and thereafter moved along one of the rails in such way that the load carrier bar will essentially become perpendicular to the roof rails. This movement may cause scratches on the roof rails. In addition, it may happen that the movable hook hits the roof of the vehicle during mounting and may then cause damage. In connection with lower roof rails, it is a risk that included movable hooks can hit the roof of the vehicle, causing undesired damage.

SUMMARY

A purpose with the disclosed arrangement is to minimize the risk of damage to the carrying vehicle during mounting thereto, and to simplify and ensure correct location of the load carrier perpendicular to the roof rails of the vehicle.

The present arrangement overcomes the above mentioned disadvantages through the introduction of a load carrier of the type mentioned above and which is characterized by a movable clamping jaw that is essentially firmly connected to at least one guiding protrusion located at a distance from the movable clamping jaw and in a first mounting position is arranged in such way that the distance between the guiding protrusions, which are located at each end of the load carrier, is larger than the distance between the roof rails.

BRIEF DESCRIPTION OF THE DRAWINGS

A load carrier foot according to the present disclosure will be described further with reference to the accompanying drawings, in which.

DETAILED DESCRIPTION

Figure 1:
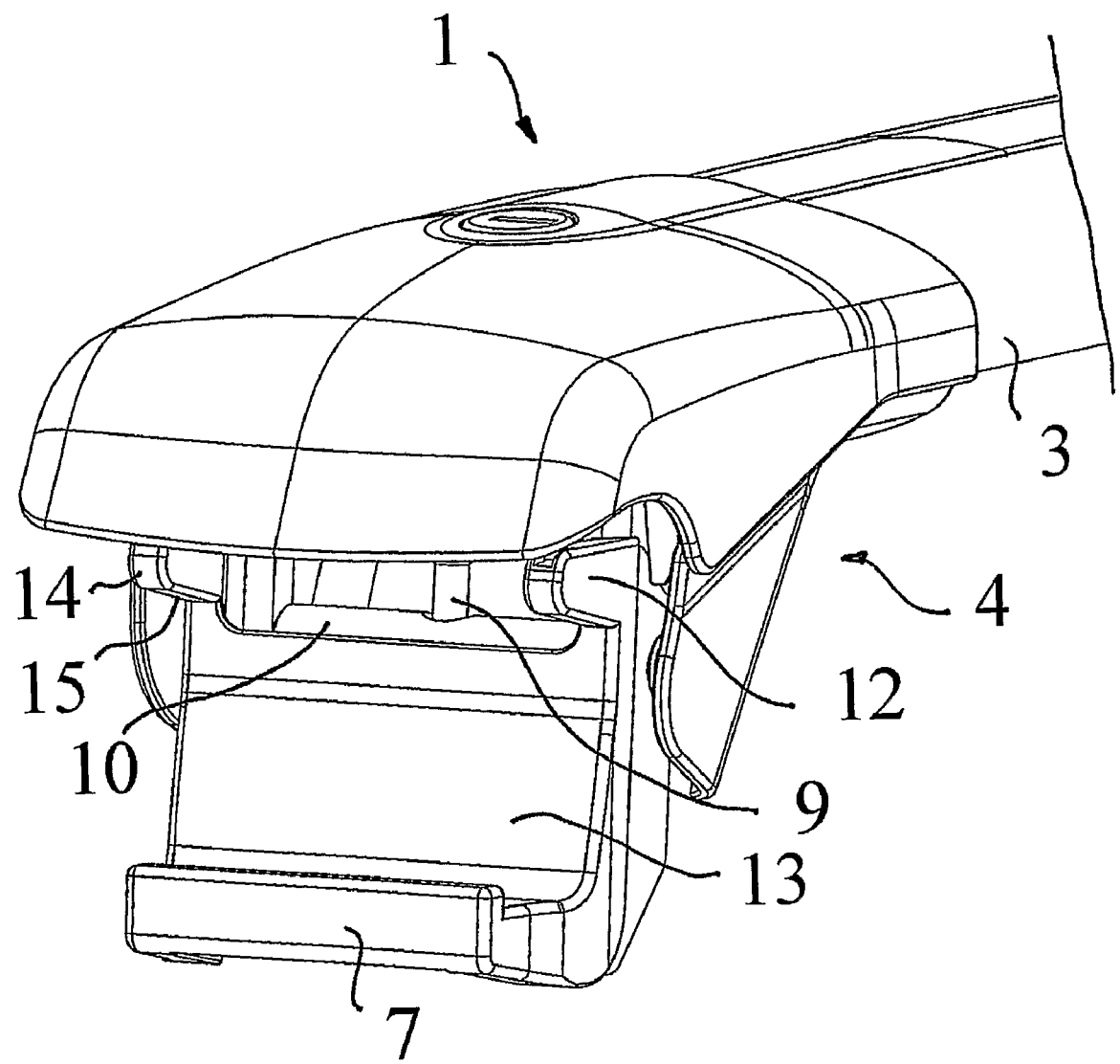
FIG. 1 is a schematic view in perspective of a representative load carrier foot configured according to the present disclosure.
Figure 2:
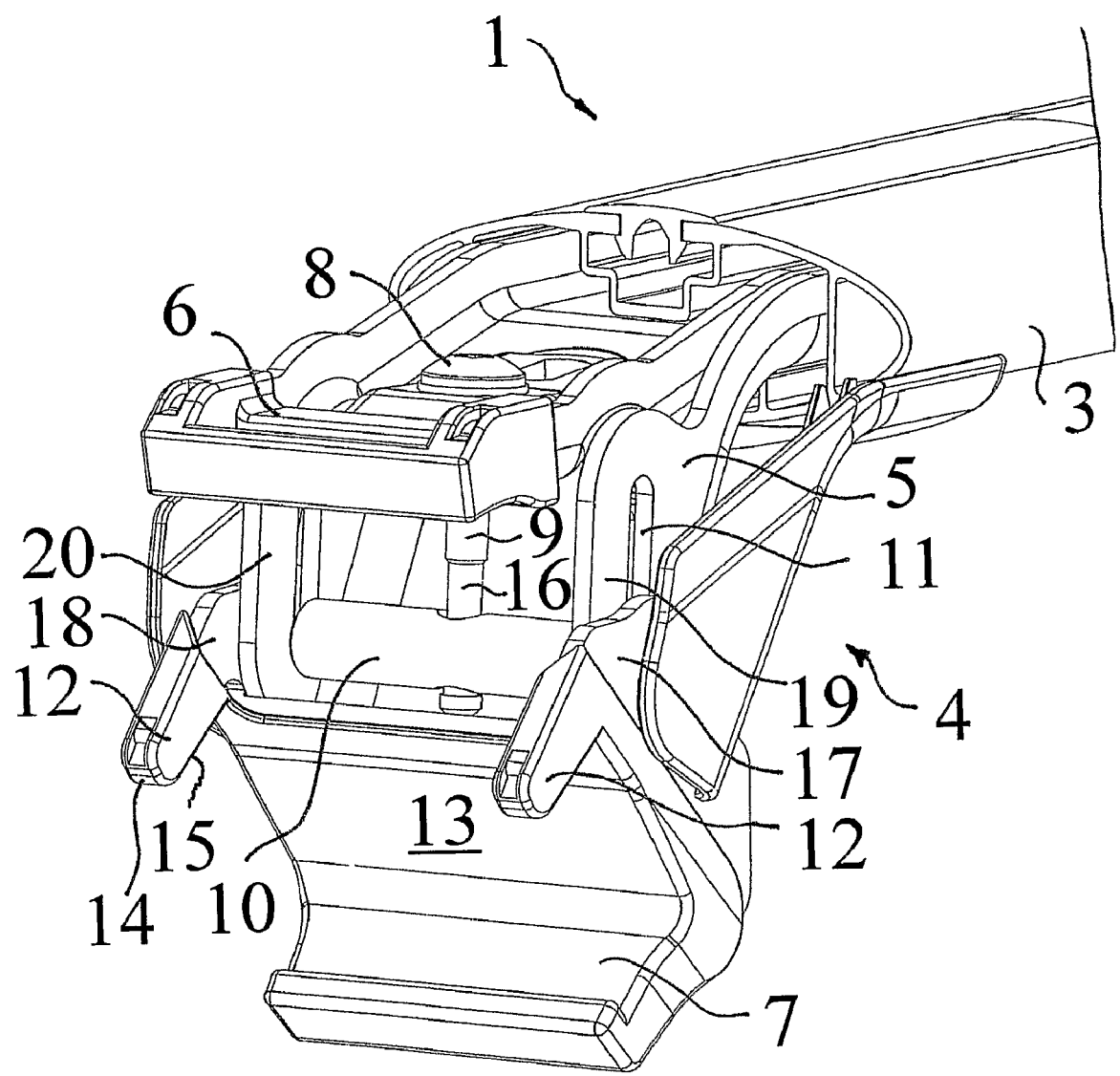
FIG. 2 is a schematic view in perspective of the load carrier foot, in an open position and without any exhaustive cover.

The load carrier 1, shown in FIGS. 1 to 5, is designed and arranged to be mounted at a pair of fixed roof rails 2 of a vehicle. In the Figs., only one end of a load carrier 1 is depicted and to clearly illustrate the invention, it is shown without any exhaustive cover in FIGS. 2 to 5.

The load carrier 1 comprises a load carrier bar 3, which extends across the roof of the vehicle between two parallel and firmly arranged roof rails at lateral sides of the vehicle's roof. The carrier bar has a load carrier foot 4 arranged each of both ends of the bar for clamping the load carrier 1 to the parallel roof rails 2. The load carrier bar 3 may have any suitable cross section such as a square profile or an oval profile.

The load carrier foot 4 includes a body 5, preferably made of metal, which is connected to the load carrier bar 3. The body 5 has a fixed clamping jaw 6 and a movable clamping jaw 7 arranged on opposite upper and lower sides of the respective roof rail 2 and cooperates with a clamping device 8, which is arranged to move the movable clamping jaw 7 towards the fixed clamping jaw 6, wherein the load carrier foot 4 is firmly clamped to the roof rail 2.

The movable clamping jaw 7 is pivotally connected to the load carrier foot 4 and is in a first mounting position arranged in such way that the distance between the movable clamping jaws 7, which are located in each end of the load carrier 1, is less than the distance between the roof rails 2 which are located on each side of the vehicle.

The illustrated clamping device 8 shows a bolt 9, which extends through a hole in the body to a threaded hole in a axle 10 that runs in a groove 11 through the body 5 and which is pivotally mounted to the movable clamping jaw 7. Preferably, the bolt 9 has a non-threaded portion 16 with a reduced diameter, and of which a portion passes freely through the threaded hole in the axle 10. During installation (mounting) onto the load carrier foot, the axle 10 slides along the non-threaded portion 16 into engagement with the threads of the bolt 9. When the bolt 9 is tightened, the axle 10 is moved further along the groove 11 and raises the movable clamping jaw 7 in a direction towards the fixed clamping jaw 6. Thus, the non-threaded portion 16 reduces the number of rotations that the bolt must be turned during the installation. The axle 10, during dismantling, will fall along the non-threaded portion 16 by its own weight.

To facilitate installation of the load carrier 1, the movable clamping jaw 7 is part of an essential U-shaped profile comprising at least an upper shank or guiding protrusion 12, a waist 13, or a main body, and the lower clamping jaw 7. Preferably, the U-shaped profile has a substantial lengthwise extension in the direction of the vehicle and also has a guiding protrusion 12 in each end of the profile. The distance between the clamping jaw 7 and the guiding protrusion 12 is chosen such that the roof rail 2 runs freely therebetween and preferably it is equal to 1.05 to 1.60 times the height of the roof rails, and especially 1.1 to 1.2 times the height.

The height of the roof rails is equal to the vertical distance H (see FIG. 3) through the profile of the roof rail. In the embodiment shown, the movable clamping jaw 7 is essentially integrated with at least one guiding protrusion 12 which is located on a fixed distance from the movable clamping jaw. However, it is also contemplated that the U-shaped profile be designed in such way that the distance between the clamping jaw 7 and the guiding protrusion 12 is adjustable.

Preferably, the waist 13 is provided with side plates 17 and 18, which are arranged to abut against corresponding sidewalls 19 and 20 of the body 5. In this manner a rigid box construction is provided that increases the possible twisting forces that the load carrier 1 can resist.

Preferably, the axle 10 is pivotally mounted in the waist 13 of the U-shaped profile in such way that the U-shaped profile, before installation, falls with its opening between the clamping jaw 7 and the guiding protrusion 12 in a direction downwards towards the roof rail 2. In other words, the connection is displaced from the center of rotation in a direction away from the opening between the clamping jaw 7 and the guiding protrusion 12. Preferably, the axle 10 is thus mounted at the side plates 17 and 18.

Figure 3:
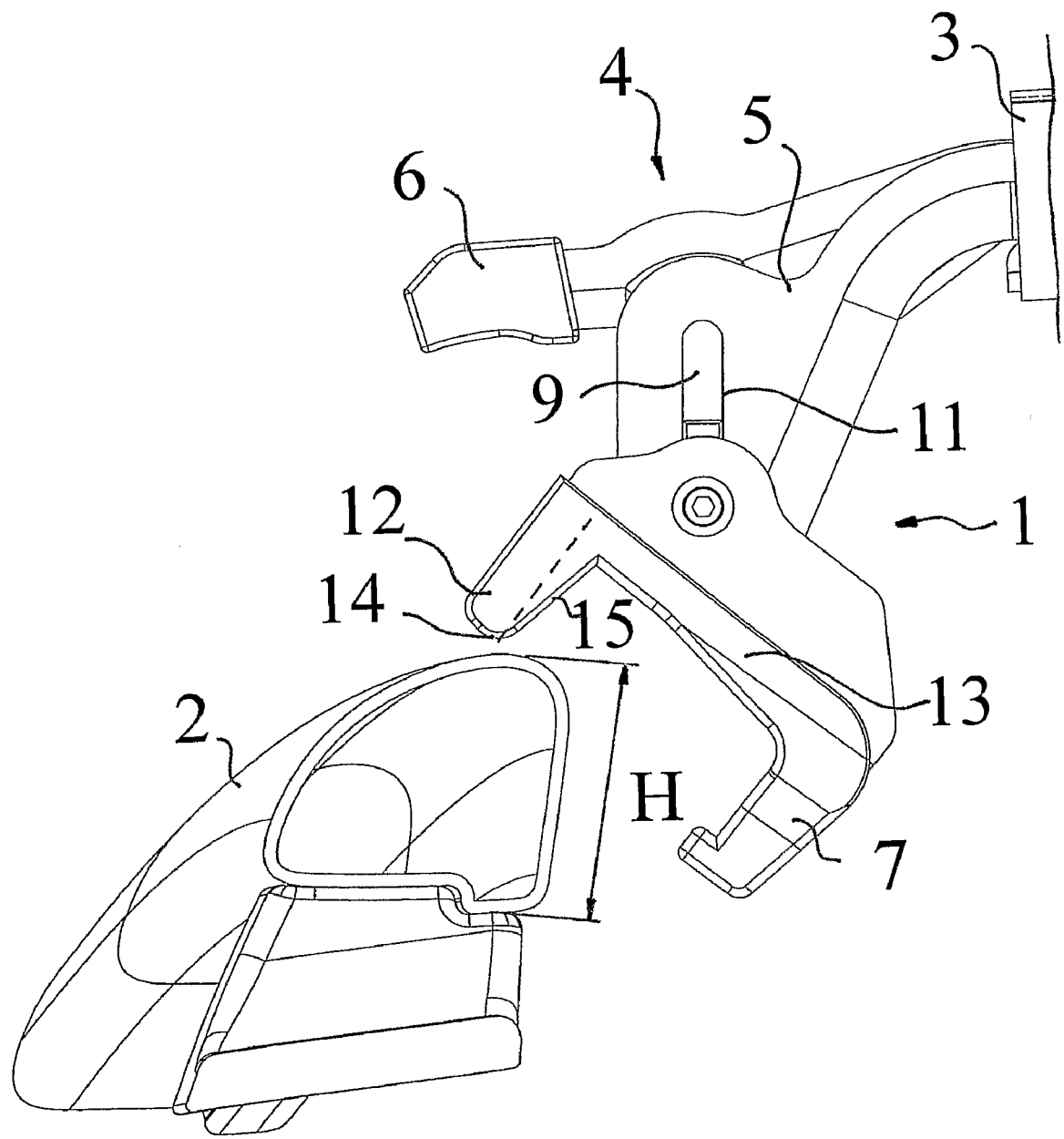
FIG. 3 is a schematic side view of the load carrier foot before being mounted to a roof rail.

The invention will now be explained with reference to FIGS. 3-5 which disclose different steps during the mounting of the load carrier to the roof rails. Firstly, as appears from FIG. 3, the load carrier 1 is held above and in correct angle towards the roof rails 2. The U-shaped profile hangs in its bottom position in the groove 11 and with the opening between the clamping jaw 7 and guiding protrusion 12 directed towards the roof rail 2, whereupon it will then be lowered to abutment against the outer portion 14 of the guiding protrusion 12. In this first mounting position, the distance between the guiding protrusions 12, which are located in each end of the load carrier 1, is larger than the distance between the roof rails 2, which are located on each side of the vehicle.

Figure 4:
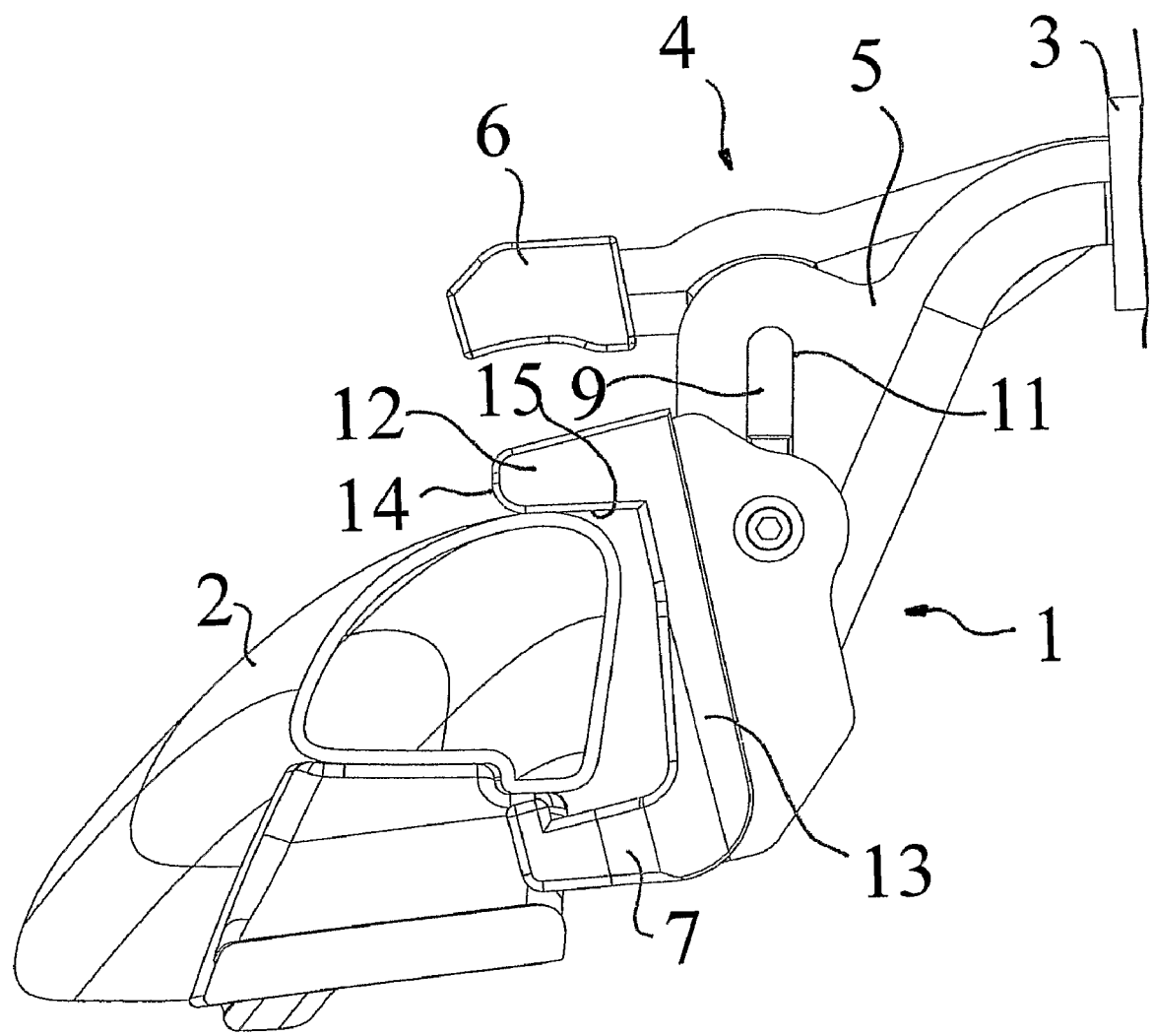
FIG. 4 is a schematic side view of the load carrier foot during installation to the roof rail.
Figure 5:
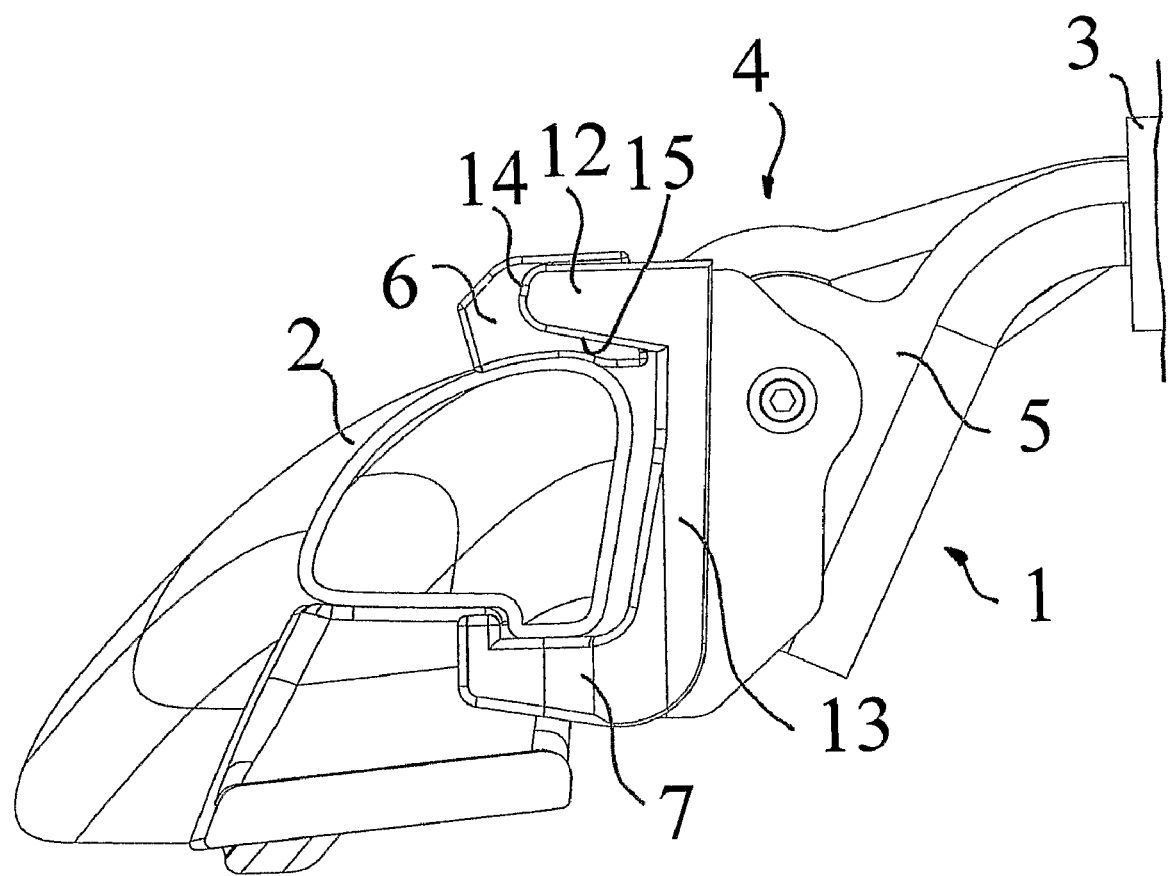
FIG. 5 is a schematic side view of the load carrier foot after installation to the roof rail.

Secondly, as appear from FIG. 4, the guiding protrusion 12 will slide against the roof rail 2 along a lower abutting surface 15 of the guiding protrusion 12. This abutting surface 15 may be inclined so that the opening between the clamping jaw 7 and the guiding protrusion 12 tapers inwardly (see FIG. 3) to facilitate the movement, wherein the U-shaped profile is turned around the axle 10 in such way that the movable clamping jaw 7 is moved in position beneath the roof rail 2. By the fact that the load carrier 1 with the projecting guiding protrusions 12 is longer than the distance between the roof rails, the risk that the load carrier 1 may hit the roof of the vehicle is avoided.

The guiding protrusions 12 rest against the roof rail 2 and the side plates 17 and 18 of the U-shaped profile will slide against the sidewalls 19 and 20 of the body, together with the axle 10, which follows the groove 11 until the fixed clamping jaw 6 abuts against the roof rail 2. Simultaneously the axle 10 runs along the non-threaded portion 16 to engagement with the threads of the bolt 9. By tightening the bolt 9 the movable clamping jaw 7 will also raise to abutment against the lower side of the roof rails and thereby being firmly clamped against this.

Thus, the load carrier foot 4 is firmly clamped to the roof rail 2 by the fixed clamping jaw 6 and the movable clamping jaw 7 that are located on opposite sides of the roof rail 2. Thus, in the clamped position, the guiding protrusions are not in engagement with the roof rail 2. A primary beneficial feature of the presently disclosed design is that the movable clamping jaw 7 passes the roof rail 2 with clearance and during installation is turned into engagement with the roof rail 2.

Naturally, the above described twisting action may be performed in another way than which is depicted in the Figs. For example, the clamping jaw may be parallel with the roof rail and during installation be turned in engagement transversely to the roof rail. However, this is not preferred as such twisting restricts possible mounting in the vicinity of the fixation points of the roof rails.

The invention claimed is:

1. A load carrier for fixed roof rails of a vehicle, said load carrier comprising:
   a load carrier bar with a load carrier foot at each end of the load carrier bar for clamping of the load carrier to a pair of essentially parallel roof rails, each load carrier foot comprising a fixed clamping jaw and a movable clamping jaw adapted configured to be arranged on an upper side and an opposite lower side of the respective roof rails and to cooperate with a clamping device that is configured to move the movable clamping law towards the fixed clamping jaw so that the load carrier foot is firmly clamped at respective roof rails at ends of the load carrier bar;
   each of the movable clamping jaws is pivotally connected at its respective load carrier foot and in a first mounting position, is arranged so that the distance between the movable clamping jaws, each of which is located at a respective end of the load carrier, is less than the distance between the respective roof rails; and
   wherein each of the movable clamping jaws is essentially firmly connected to at least one corresponding guiding protrusion, located at a distance from the movable clamping jaw and in a first mounting position is arranged so that the distance between the guiding protrusions, each of which is located at a respective end of the load carrier, is larger than the distance between the roof rails;
   wherein each of the guiding protrusions, during installation of the carrier, is arranged to slide against the roof rail along a lower abutting surface of the guiding protrusion.

2. The load carrier as recited in claim 1, wherein the movable clamping jaw, via an axle, is pivotally mounted to a body of the load carrier foot.

3. The load carrier as recited in claim 1, wherein the movable clamping jaw is part of an essentially U-shaped profile, comprising at least said upper guiding protrusion and in that the U-shaped profile is rotatable around the axle, in such way that the movable clamping jaw is movable in position under the roof rail.

4. The load carrier as recited in claim 1, wherein the abutting surface of the guiding protrusion is inclined.

5. The load carrier as recited in claim 2, wherein the axle runs in a groove through the body.

6. The load carrier as recited in claim 5, wherein the clamping device arranged to move the axle along the groove and to raise the movable clamping jaw in direction towards the fixed clamping jaw.

7. The load carrier as recited in claim 1, wherein the distance between the movable clamping jaw and the guiding protrusion is equal to 1.05-1.60 times the height of the roof rails.

8. The load carrier as recited in claim 7, wherein the distance between the movable clamping jaw and guiding protrusion is adjustable.

9. The load carrier as recited in claim 3, wherein the axle is pivotally mounted in a waist of the U-shaped profile and the connection is displaced from the center of rotation in a direction away from the opening between the clamping jaw and the guiding protrusion so that the U-shaped profile, before installation, falls with an opening between the clamping jaw and guiding protrusion in a direction downwards towards the roof rail.

10. The load carrier as recited in claim 1, wherein the distance between the movable clamping jaw and the guiding protrusion is equal to 1.1-1.2 times the height of the roof rails.

* * * * *